Sept. 17, 1946.  G. W. HERROLD  2,407,664
TRANSFERRING DEVICE FOR ANNEALING LEERS
Filed June 15, 1944  3 Sheets-Sheet 1

INVENTOR.
Gordon W. Herrold
BY
Norman N. Holland
ATTORNEY

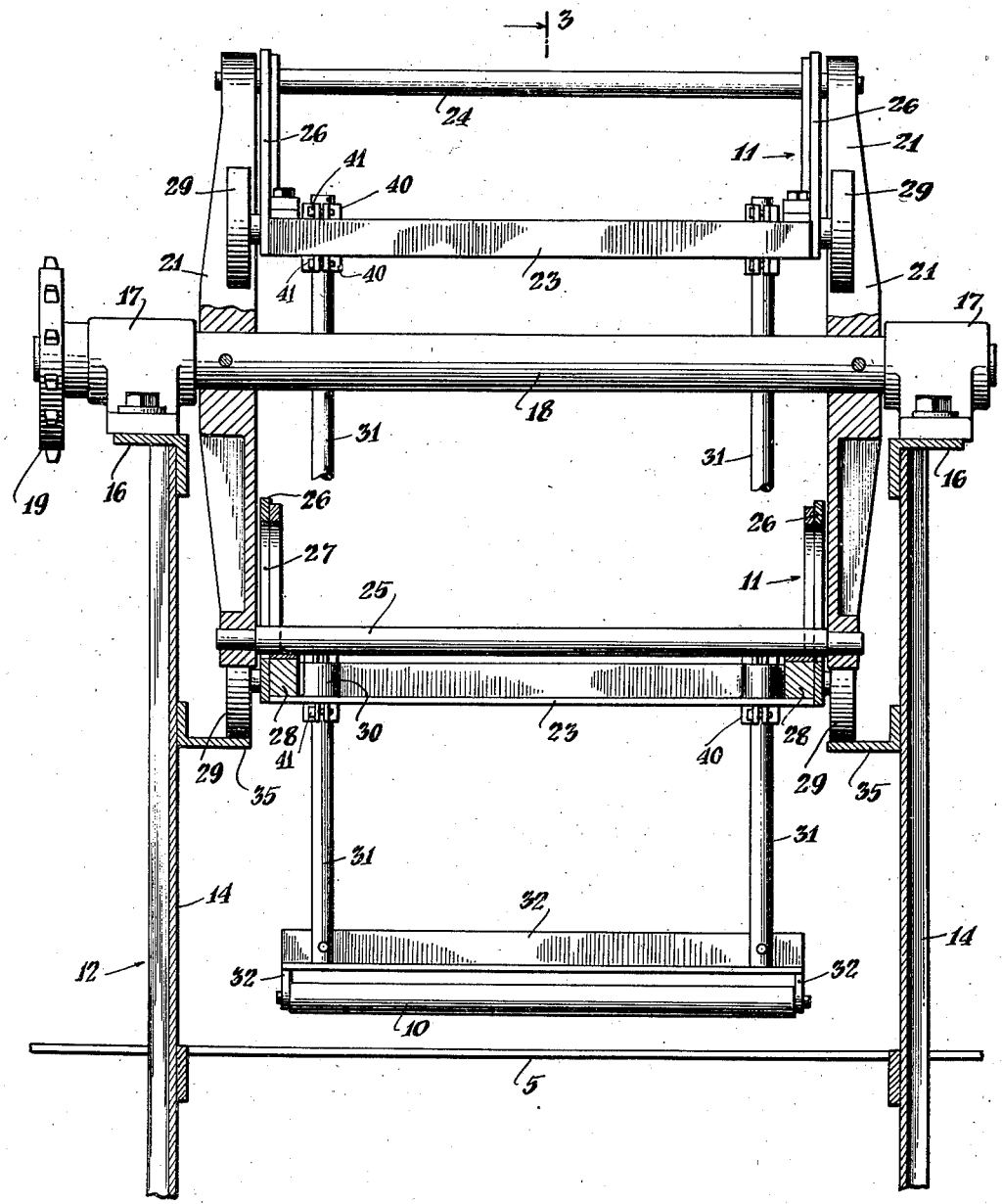

Sept. 17, 1946. G. W. HERROLD 2,407,664
TRANSFERRING DEVICE FOR ANNEALING LEERS
Filed June 15, 1944 3 Sheets-Sheet 3
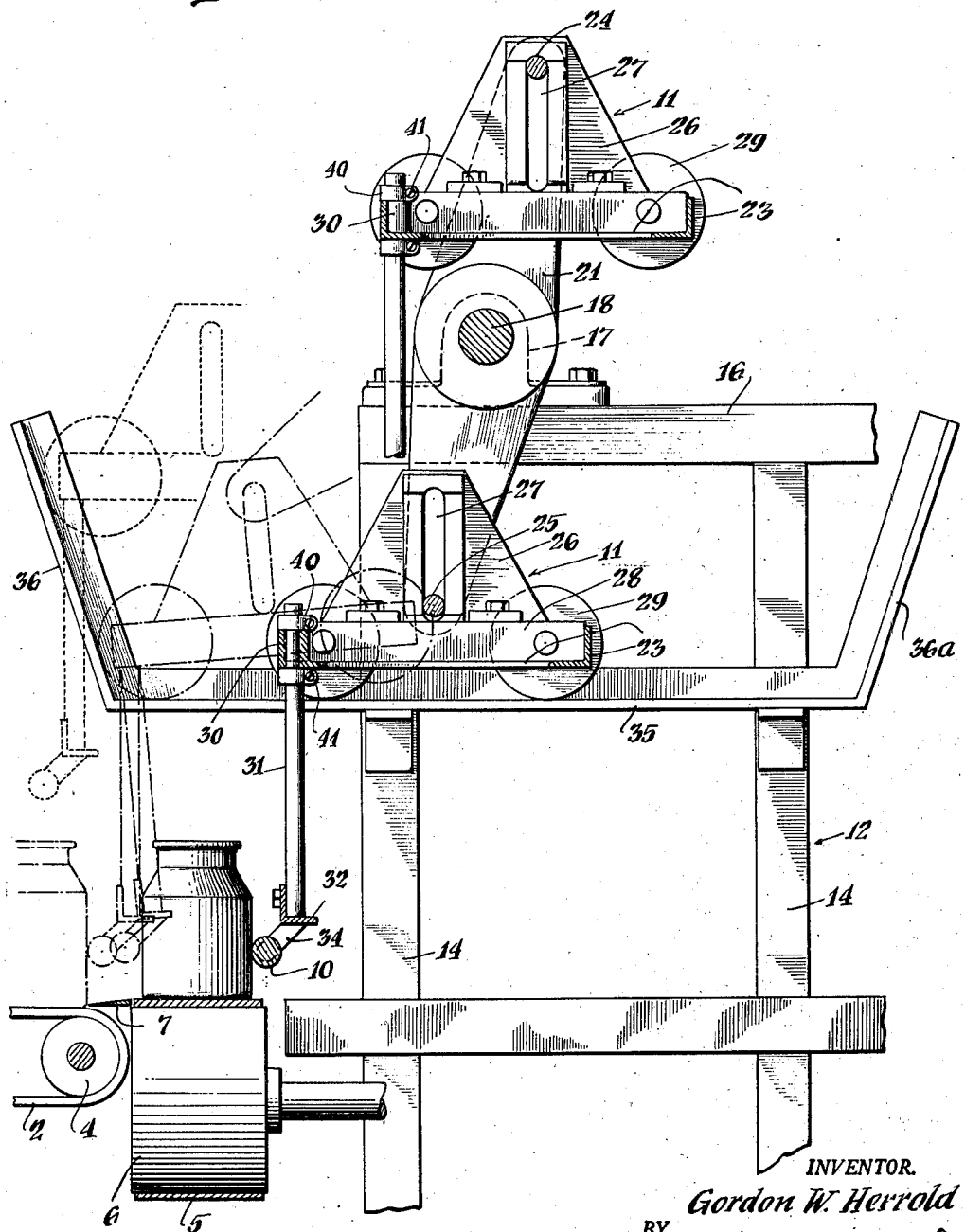
INVENTOR.
Gordon W. Herrold
BY
Norman T. Holland
ATTORNEY Patented Sept. 17, 1946

2,407,664

UNITED STATES PATENT OFFICE 2,407,664

TRANSFERRING DEVICE FOR ANNEALING LEERS

Gordon W. Herrold, Connellsville, Pa., assignor to Anchor Hocking Glass Corporation, Lancaster, Ohio, a corporation of Delaware Application June 15, 1944, Serial No. 540,507

25 Claims. (Cl. 198—31)

1

The present invention relates generally to transfer devices and more particularly to a device for transferring glass articles from a conveyor to an annealing leer, such devices being generally known as stackers.

In the manufacture of glassware, the raw materials such as soda, lime and silica are fed to a furnace and brought to a molten condition. The molten glass is then fed by feeders to a series of forming or fabricating machines which mold various articles such as containers, dishes, etc., from the molten glass. When the articles are delivered from the forming machines, there are internal strains within the glass which weaken the structure so that if sold in that condition, changes in temperature or impacts are likely to cause breakage. In order to remove these strains, it is necessary for the glass to be annealed. This is done by passing the glass articles through an annealing leer where they are maintained at a substantial temperature until the strains are relieved and are then cooled gradually to avoid development of excessive strains. The containers are ordinarily transferred from the forming machines to the leer by a series of conveyors. One conveyor generally extends transversely across the end of the leer for convenience in transferring the containers therefrom into the leer.

The present invention relates more particularly to a device for transferring the containers from this transverse conveyor into the leer. Various devices have been utilized heretofore for this purpose. Some of them raise the vessels individually and place them in the leer. Others attempt to push the groups of articles from the conveyor into the leer. The various devices heretofore devised for these purposes have been difficult to operate and have not been satisfactory in accomplishing the results desired. The glass is fragile and broken glass is objectionable in the leer. In addition, glass machinery runs twenty-four hours a day and any stoppage may require a shut-down not only of the stacker but of the other machinery.

The present invention aims to overcome the difficulties of prior devices by a simple and effective mechanism which will automatically transfer vessels from a conveyor into the leer as they are delivered by the conveyor. The simplicity of the device minimizes the difficulties encountered and minimizes also the breakage and disarrangement of the containers transferred.

An object of the invention is to provide a simple and effective device for transferring glass articles from one position to another.

2

Another object of the invention is to provide an improved continuously driven device for transferring groups of articles from one position to another.

Another object of the invention is to provide a continuously rotating mechanism which engages and removes containers from one position to another and which embodies means for reversing the movement of the engaging member to disengage the articles without stopping the rotation of the mechanism.

Another object of the invention is to provide a rotary mechanism for driving one or more pusher bars successively in a closed orbit and embodying means for guiding the bars in a substantially horizontal direction while in engagement with the containers.

Another object of the invention is to provide an improved means for disengaging a pusher bar from glass containers and for causing the pusher bar to clear the containers in its movement with respect to them after they have been moved to their proper position.

Other and further objects of the invention will be obvious upon an understanding of the illustrative embodiment about to be described or will be indicated in the appended claims and various advantages not referred to herein will occur to one skilled in the art upon employment of the invention in practice.

A preferred embodiment of the invention has been chosen for purposes of illustration and description and is shown in the accompanying drawings, forming a part of the specification, wherein Fig. 1 is a perspective view illustrating a preferred embodiment of the transferring mechanism attached to the front end of a leer for annealing glassware;

Fig. 2 is a sectional view along the line 2—2 of Fig. 1; and

Fig. 3 is a sectional view along the line 3—3 of Fig. 2.

Figure 1:
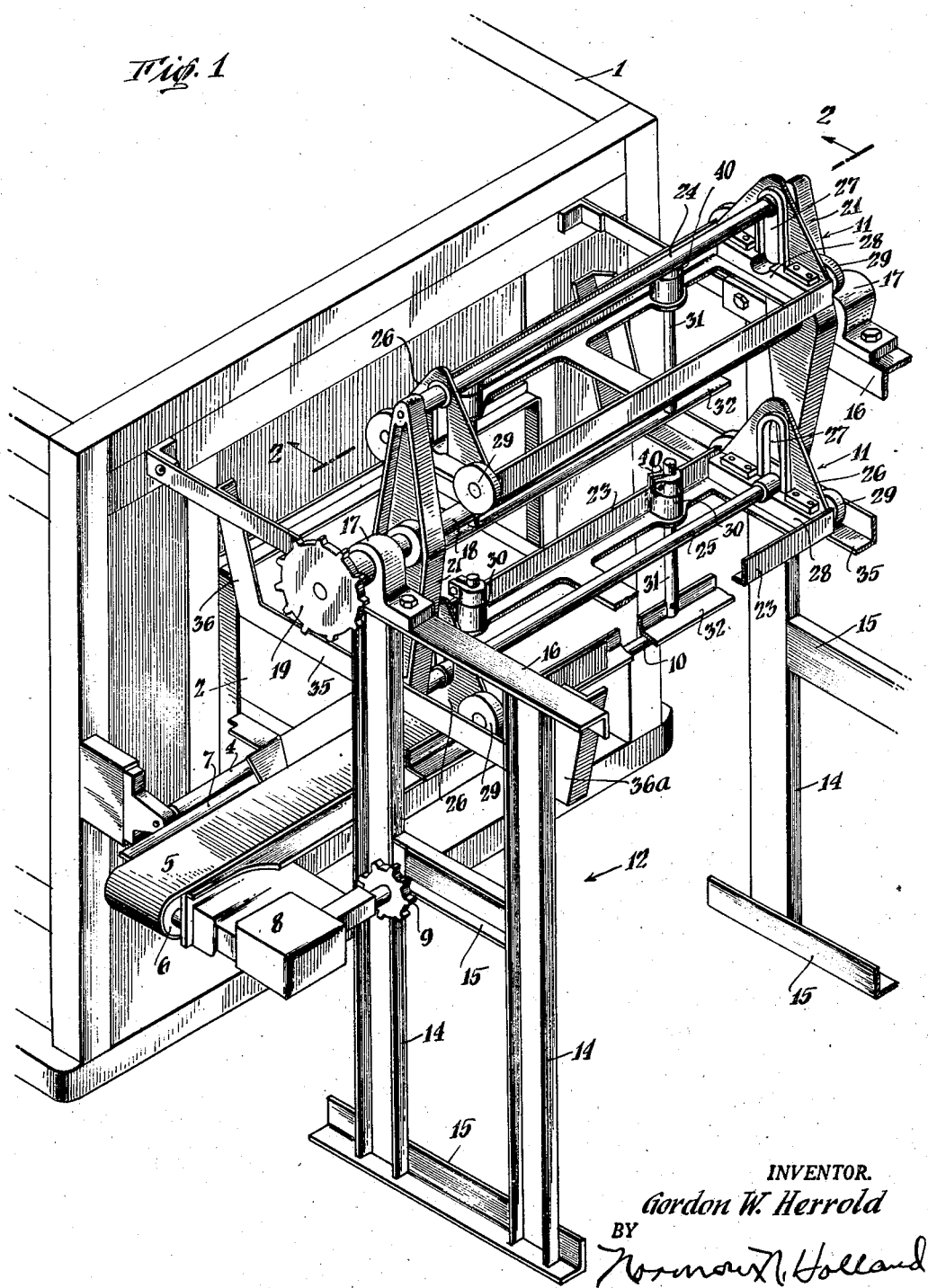

Referring again to the drawings illustrating a preferred embodiment of the invention and more particularly to Figs. 1 and 2, there is shown an annealing leer 1 which is essentially an elongated tunnel having a conveyor 2 moving slowly through it. The conveyor is shown in Fig. 3 mounted on rollers or pulleys 4. Since annealing leers are known, a detailed description of the one shown is not believed to be necessary as the leer is not a part of the present invention.

Preferably, a second conveyor, illustrated as a belt 5, mounted on pulleys 6, extends transversely of the front end of the leer. Containers leaving the fabricating or forming machines (not shown) eventually reach this conveyor and pass transversely across the end of the leer and adjacent the end of the wide conveyor 2, which conveys the containers through the leer. A suitable plate 7 adjoining the belt may be utilized for providing a smooth floor or surface from the belt conveyor 5 onto the leer conveyor 2. The belt conveyor 5 may be driven by any suitable means, for example the reduction gears 8 operatively connected to a drive gear 9, which in turn may be operatively connected to a suitable motor (not shown). Preferably the motor has a variable speed drive so that the drive of this conveyor may be synchronized with the drive for the stacker.

The present invention relates more particularly to the mechanism for transferring the containers, which are delivered in a row, one behind the other, on the conveyor 5, into the end of the leer as shown more particularly in Figs. 1 and 3. The mechanism for this purpose may comprise a pusher bar 10 having a length substantially equal to the width of the leer conveyor 2 and extending along the belt conveyor 5 in front of the leer. The pusher bar is connected to a carriage shown as a truck 11. The improved transfer device moves the pusher bar to transfer a row of containers into the leer with minimum disturbance to the containers and returns the pusher bar for transferring a succeeding row.

The mechanism for operating the pusher bar 10 and carriage 11 and for transferring the containers or glassware into a leer will now be described. A suitable table or support 12 is provided by means of vertical channel members 14 resting at their lower ends on angle irons 15 at the respective ends of the table. The channel members 14 may be braced at their middle by means of channels 15. Suitable angle irons 16 may be welded or otherwise secured to the upper ends of the vertical channels 15 to serve as a support for the operating mechanism. A pair of bearings 17 are secured to the respective angle irons 16 with a shaft 18 extending therethrough and having a drive gear 19 at one end thereof for the continuous rotation thereof. The drive gear 19 may be driven in any suitable manner, for example by a motor (not shown) which preferably has a variable speed drive for adjusting the speed to correspond to the speed of the conveyor 5.

The shaft 18 has a pair of members 21 keyed thereto adjoining the bearings 17. The members 21 are shown herein in the form of two integral diametric arms. A shaft or rod 24 connects the arms at one end and a shaft or rod 25 connects the arms at the other end. It will be understood, of course, that while two arms are shown, a greater or less number may be utilized within the scope of the invention. Upon rotation of the main shaft 18, these rods 24 and 25 rotate in a circular orbit about the main shaft 18.

Each of the rods 24 and 25 is provided with a carriage 11 which will now be described. Since the two carriages shown are the same, a description of one will suffice. The carriage 11, preferably comprises a triangularly shaped member 26 at each end having a slot 27 extending vertically thereof through which one of the shafts 24, 25 passes. The two end members 26 may be joined by angle irons 23 to form a rigid structure. Likewise the members 26 may be provided with reinforcing members 28. The exact construction of the end members 26 may be varied. Rollers 29 are mounted on stub shafts operatively connected to end members 26. Preferably there are two rollers 29 at the respective ends of the end pieces 26 so that each carriage 11 has four supporting rollers.

The front angle bar 23 has bearings 30 therein for receiving and slidably mounting the upper ends of the vertical rods 31 which are connected at their bottoms to an angle iron 32. The rods 31 are held in position in the bearings 30 by split collars 40 above and below the bearings which may be clamped about the rods by bolts 41. The collars 40 permit vertical adjustment of the rods so that the height of the pusher bar 10 may be changed for different heights of containers to engage the containers substantially at the plane of the centers of gravity. The pusher bar or roller 10 is operatively connected to the angle iron 32 by means of brackets 34. Thus the pusher bar 10 is operatively connected to the carriage 11. Upon rotation of the main drive shaft 18, the carriages 11 will be swung in a closed orbit with the shaft 24 or 25, as the case may be, normally located at the upper end of the slots 27. In order to cause the pusher bar 10 to move in a horizontal direction during the period that it is in engagement with the containers, runways 35 are provided at the respective ends of the device which may be formed of angle irons. The rollers 29 on the carriage 11 engage the horizontal portions of the angle irons, thereby preventing the carriage from moving in a vertical direction and causing it to move in a horizontal direction for a substantial part of its travel. The slots 27 permit this rectilinear movement without interfering with the rotary movement of the drive. Thus the carriage 11 at the lower part of its orbit moves in a horizontal direction and carries the pusher bar 10 attached thereto in a similar direction to prevent relative movement between the containers and the pusher, thereby minimizing any disarrangement of the containers and any resulting breakage.

The front ends of the angle irons forming the runways 35, preferably have an upstanding part 36 at a slight angle to the vertical. The position of these parts 36 are such that the front rollers 29 on the carriage engage them at the limit of travel desired for the containers and for the pusher bar 10. When the forward rollers 29 engage the members 36, further horizontal movement of the carriage 11 is prevented. Continuous rotation of the shaft 18 and the supporting rods 24 or 25, as the case may be, causes the carriage 11 to tilt as shown in dotted lines in Fig. 3 so that the rear rollers 29 are raised off of the horizontal portion of the guideway 35. The tilting of the carriage causes the rods 31 attached thereto to be tilted also, which in turn reverses the movement of the pusher bar 10 to cause it to disengage the containers as shown more particularly in dotted lines in Fig. 3. As the shaft 18 and the arms 21 thereon continue to rotate, the supporting rod 24 or 25, as the case may be, moves to the upper ends of the slots 27 and then raises the carriage 11 as shown in dotted lines in Fig. 3 with the forward wheels 29 engaging the inclined portion 36 to minimize vibration and to guide the carriage in this part of its movement. A corresponding upstanding part 36a is shown at the opposite end of the horizontal portion 35 which serves to engage the opposite rollers on the carriage on the downward movement of the carriage to prevent vibration, and to stabilize the movement of the carriage as it is about to reach the horizontal position.

The motor or other drive for the shaft 18 and likewise the drive for the conveyor 5 as well as the drive for the leer conveyor 2 are not shown herein. It will be understood, however, that these conveyors are timed with respect to each other so that a row of containers is delivered across the end of the leer by the belt conveyor 5 while the pusher bar 10 is disengaging a transferred row of containers and while the other pusher is engaging the new row of containers where two pusher bars are utilized. This substantial synchronization of the drives may be accomplished by operatively connecting the mechanisms to the same source of power; however, it is preferred to have a separate drive for each with a variable speed, preferably a variable speed motor or a variable drive between the motors and the devices. The latter is preferable where the source of power is alternating current.

In the operation of the device, the containers are delivered in a row by the belt conveyor 5 in front of the open end of the leer ready to be transferred onto the conveyor 2 of the leer. The continuous rotation of the shaft 18 of the transfer device moves the carriages 11 in an orbit about the shaft. The wheels 29 at the lower portion of the orbit engage the guideways 35 and roll along the guideways, being driven by the rod 24 or 25 operating in the slots 27. Thus, the movement of the carriage 11 is in a horizontal direction at the bottom of its orbit so that the pusher bar 10 secured thereto likewise moves in a horizontal direction. Thus, during engagement with the containers, the pusher bar 10 does not move in a vertical direction and has no relative movement with respect to the containers. Preferably the pusher bar engages the containers substantially in the plane of their centers of gravity to minimize any tendency of the containers to topple. As the pusher bar reaches the end of its forward movement, the forward rollers 29 engage the upstanding parts 36 of the runways 35 which tilt the carriage as shown in Fig. 3 so that the rear rollers 29 move upwardly off the runway 35 and the pusher bar 10 moves in a reverse direction to disengage the containers. Continued movement of the shaft 18 causes the bar 24 or 25 to move to the upper end of the slots 27 and raise the carriage 11 upwardly along the member 36. This upward movement causes the pusher bar likewise to move upwardly with substantial clearance with respect to the containers, which it has just disengaged. The carriages 11 continue their movement for successive cycles in this manner.

It will be seen that the present device is simple in construction, easy to operate and readily manufactured from available material. The pusher bar is movable slowly in a horizontal position as it engages the containers and when the proper transfer of the containers has been accomplished, reverses its movement to disengage the containers and clears the containers in its upward movement, while returning to the proper position for engaging a succeeding row of containers. By reason of the simplicity of the device, there is little possibility of the parts becoming out of order or of the device having to be shut down for repairs. The disengagement of the pusher bar from the containers minimizes any chance of disarrangement thereof. In addition, the steady horizontal movement of the pusher bar is effective to accomplish the results desired.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described in some detail one embodiment of my invention, I claim:

1. In a device of the class described, the combination of a truck including a member for engaging and moving an article, means for rotating said truck with said member in an orbit about an axis, a track above the member on which the truck runs, and means forming part of the track for moving said member away from said article while continuing the movement of said rotating means.

2. In a device of the class described, the combination of a truck including a bar for engaging and moving a series of articles, means for rotating said truck with said bar in an orbit about an axis, a track above the bar on which the truck runs, and means forming part of the track for moving said bar away from said articles while continuing the movement of said rotating means.

3. In a device of the class described, the combination of a truck including a member for engaging and moving a row of articles, means for moving said truck with said member in an orbit about an axis, a track above the member on which the truck runs, and means forming part of the track cooperating with said moving means to reverse the movement of said member, when said articles have been moved to a desired position, without stopping the movement of said moving means.

4. In a device of the class described, the combination of a truck including a member for engaging and moving a row of glass containers, means for moving said truck with said member in an orbit about an axis to engage and move the containers at one portion of its orbit of movement, a track above the member on which the truck runs, and means forming part of the track cooperating with said moving means to reverse the movement of said member, when said glass containers have been moved to a desired position, without stopping the movement of said moving means.

5. In a device of the class described, the combination of a shaft, means for rotating said shaft, a pair of arms mounted on said shaft, a truck including a member for engaging and moving articles, means including said truck for mounting said member on said arms, a track above the member on which said truck runs, and means forming part of the track for reversing the movement of said member to disengage the articles when the articles have been moved to their desired position.

6. In a device of the class described, the combination of a shaft, means for continuously rotating said shaft, a pair of arms mounted on said shaft, members for engaging and moving articles, trucks each including one of said members pivotally secured to said arms for mounting said member on said arms, tracks above the members on which the truck runs and means forming part of the track for reversing the movement of said members to disengage the articles when the articles have been moved to their desired position.

7. In a device of the class described, the combination of a shaft, means for rotating said shaft, a pair of arms mounted on said shaft, members for engaging and moving articles, trucks each including one of said members slidably secured to said arms for mounting said member on said arms, tracks above the members on which the trucks run and means forming part of the track for reversing the movement of said member to disengage the articles when the articles have been moved to their desired position.

8. In a mechanism of the class described, the combination of a shaft, means for rotating said shaft, a pair of arms mounted on said shaft, trucks including members for engaging and moving articles, tracks above the members on which the trucks run, and devices forming part of the trucks slidably connecting said member and said arms for driving said member to move said articles.

9. In a mechanism of the class described, the combination of a shaft, means for rotating said shaft, a pair of arms mounted on said shaft, trucks including members for engaging and moving articles, tracks above the members on which the trucks run and devices forming part of the trucks slidable with respect to said arms for mounting said member, said tracks forming means for sliding said devices when said members are in engagement with the articles to prevent vertical movement of the member with respect to the articles.

10. In a device for moving glass articles into an annealing leer, the combination of an arm adapted to rotate about a substantially horizontal axis, a truck including a member adapted to engage and move articles into the leer, a track above the member on which the truck runs, and means forming part of the truck and slidably mounted on said arm and secured to the member, whereby said arm rotates said member in an orbit about said axis and carries the truck along a straight section of the track.

11. In a device for moving glass articles into an annealing leer, the combination of an arm adapted to rotate about a substantially horizontal axis, a truck including a member adapted to engage and move articles into the leer, a track above the member on which the truck runs, means forming part of the truck and slidably mounted on said arm and secured to the member, whereby said arm rotates said member in an orbit about said axis and carries the truck along a straight section of the track, and means forming part of the track for reversing the movement of the member to disengage the articles when they have been moved to their desired position.

12. In a device for moving glass articles into an annealing leer, the combination of an arm adapted to rotate about a substantially horizontal axis, a truck including a member adapted to engage and move articles into the leer, a track above the member on which the truck runs, means forming part of the truck and slidably mounted on said arm and secured to the member, whereby said arm rotates said member in an orbit about said axis, and means forming part of the track for preventing downward movement of the member while it is in engagement with the articles.

13. In a mechanism for moving glass articles into an annealing leer, the combination of a horizontal shaft, a pair of arms secured to said shaft, trucks including devices slidably mounted on said arms and each carrying a bar for engaging and moving containers, and tracks above the bar forming guides for limiting the vertical movement of said devices while they hold the bar in engagement with the glass articles.

14. In a device for moving glass articles into an annealing leer, the combination of a horizontal shaft, a pair of arms secured to said shaft, trucks including devices slidably mounted on said arms and each carrying a bar for engaging and moving containers, and runways above the bar for supporting said trucks while they are in engagement with the glass articles.

15. In a device for moving glass articles into an annealing leer, the combination of a horizontal shaft, a pair of arms secured to said shaft, a second shaft secured to the other ends of said arms, trucks including devices slidably mounted on said arms and each carrying a bar for engaging and moving containers, and runways above the bar for supporting said devices while they are in engagement with the glass articles.

16. In a device for moving glass articles into an annealing leer, the combination of a horizontal shaft, a pair of arms secured to said shaft, a second shaft secured to the outer ends of said arms, devices pivotally and slidably mounted on said second shaft having a member thereon adapted to engage and move glass articles, and a pair of runways, said devices having wheels thereon adapted to engage said runways when said member is in engagement with the glass articles, said runways having upwardly extending portions at one end thereof to swing said devices about said second shaft to reverse the movement of said member and disengage it from the articles.

17. In a device for moving glass articles into an annealing leer, the combination of a horizontal shaft, a pair of arms secured to said shaft, a second shaft secured to the outer ends of said arms, devices slidably mounted on said second shaft having a member spaced downwardly from said second shaft and adapted to engage and move glass articles, a pair of runways, said devices having wheels thereon adapted to engage said runways when said member is in engagement with the glass articles, and means for swinging said devices about said second shaft to reverse the movement of said member and disengage it from the articles.

18. In a device for moving glass articles into an annealing leer, the combination of a pair of arms pivoted at one end, means for rotating said arms in unison about the pivot, devices pivotally and slidably connected to said arms, said devices having a member thereon adapted to engage and move glass articles, a horizontal member for limiting the downward movement of said device to cause said article engaging member to move in a horizontal direction during its engagement with the articles, and means for moving said member away from the articles when they have reached their desired position without stopping the movement of said arms.

19. In a device for moving glass articles into an annealing leer, the combination of a pair of arms pivoted at one end, means for rotating said arms in unison about the pivot, trucks including devices slidably connected to said arms, said trucks each carrying a member thereon adapted to engage and move glass articles, a horizontal track above the members for limiting the downward movement of said device to cause said article engaging member to move in a horizontal direction during its engagement with the articles, and means forming part of the track for moving said member away from the articles when they have reached their desired position without stopping the movement of said arms to clear the upper ends of the articles.

20. In a mechanism of the class described, the combination of means for moving a row of containers across the end of an annealing leer, a pair of horizontal runways, devices adapted to move along said runways, a member mounted on each of said devices adapted to engage and move said row of containers into the leer, extensions of the runways adapted to cause the devices to move the member rearwardly when it has moved the containers, and mechanism for raising said devices from the runways when the containers have been moved to their desired position and for placing said devices back on the runways in position to engage and move another row of containers into the leer.

21. In a mechanism of the class described, the combination of means for moving a row of containers across the end of an annealing leer, a pair of horizontal runways, devices adapted to move along said runways, a member mounted on each of said devices adapted to engage and move said row of containers into the leer, mechanism for raising said devices from the runways when the containers have been moved to their desired position and for placing said devices back on the runways in position to engage and move another row of containers into the leer, and upturned ends of said runways forming means for reversing the movement of said members as said devices are raised to cause the member to back away from the containers.

22. The combination with a moving conveyor adapted to convey articles through a leer, of a second conveyor carrying articles transversely of the leer conveyor, a member for pushing said articles from the second conveyor on to the leer conveyor, a carriage on which said member is mounted, runways for said carriage adapted to guide the carriage to carry the member against the containers and then lift the member, a rotating shaft, a pair of arms on said shaft engaging closed slots in the carriage to push the carriage and member and adapted to lift the carriage by the closed top of the slot, a second pair of arms on said shaft, a second carriage having slots engaged by said second arms to carry the carriage to the runways, and a second member carried against containers by the second carriage and lifted by said carriage.

23. The combination with a moving conveyor adapted to convey articles through a leer, of a second conveyor carrying articles transversely of the leer conveyor, a member for pushing a number of said articles from the second conveyor on to the leer conveyor, a reciprocating carriage on which said member is mounted, runways on which said carriage reciprocates adapted to cause the member to push containers and then rise above them, a rotating shaft, a pair of arms on said shaft engaging closed slots in the carriage adapted to push the carriage and member and adapted to lift the carriage by the closed top of the slot, a second pair of arms on said shaft, a second carriage having slots engaged by said second arms to carry the carriage to the runways while a second number of articles is being carried by the second conveyor toward the leer conveyor, and a second member carried by the second carriage against the second number of articles and then lifted by the runways.

24. The combination with a moving conveyor adapted to convey articles through a leer, of a second conveyor carrying articles transversely of the leer conveyor, a fixed floor between them, a member for moving a group of articles from the second conveyor to the floor and to the leer conveyor, a second member adapted to operate alternately with the first member, a rotating shaft, a runway and trucks forming guiding devices driven by said shaft to travel on the runway and carrying each member to cause the members to successively move groups of articles from the second conveyor to the floor and then to the leer conveyor and then rise above the articles.

25. In a device for moving glass articles into an annealing leer, the combination of an arm adapted to rotate about a substantially horizontal axis, a member adapted to engage and move articles into the leer, means slidably driven by said arm, devices for adjustably securing said member to said means, whereby said arm rotates said member in an orbit about said axis and whereby said member may be adjusted in positions to properly engage glass articles of different heights.

GORDON W. HERROLD.